US011881058B1

(12) United States Patent
Begen et al.

(10) Patent No.: US 11,881,058 B1
(45) **Date of Patent: *Jan. 23, 2024**

(54) SYSTEMS AND METHODS FOR PROVIDING LOCALIZED FUNCTIONALITY IN BROWSER BASED POSTAGE TRANSACTIONS

(71) Applicant: Stamps.com Inc., El Segundo, CA (US)

(72) Inventors: Geoffrey C. Begen, Lake Forest, CA (US); Michael J. Biswas, Los Angeles, CA (US)

(73) Assignee: AUCTANE, INC., Austin, TX (US)

( * ) Notice: Subject to any disclaimer, the term of this patent is extended or adjusted under 35 U.S.C. 154(b) by 220 days.

This patent is subject to a terminal disclaimer.

(21) Appl. No.: 17/180,708

(22) Filed: Feb. 19, 2021

Related U.S. Application Data

(63) Continuation of application No. 16/114,819, filed on Aug. 28, 2018, now Pat. No. 10,930,088, which is a continuation of application No. 12/713,033, filed on Feb. 25, 2010, now Pat. No. 10,089,797.

(51) Int. Cl.
*G07B 17/00* (2006.01)

(52) U.S. Cl.
CPC .................... *G07B 17/0008* (2013.01); *G07B 2017/00056* (2013.01); *G07B 2017/00161* (2013.01)

(58) Field of Classification Search
CPC ...... G07B 17/0008; G07B 2017/00056; G07B 2017/00161
See application file for complete search history.

(56) References Cited

U.S. PATENT DOCUMENTS

| | | | |
|---|---|---|---|
| 1,684,756 | A | 9/1928 | Close |
| 1,988,908 | A | 1/1935 | Mackinnon |
| 2,825,498 | A | 3/1958 | Alves |

(Continued)

FOREIGN PATENT DOCUMENTS

| | | | |
|---|---|---|---|
| EP | 0137737 | A2 | 4/1985 |
| EP | 0926632 | A2 | 6/1999 |

(Continued)

OTHER PUBLICATIONS

Avery, Susan, "With new postage meters buyers can stamp out costs," Purchasing, 132, 11, Jul. 17, 2003, pp. 98-99.*

(Continued)

*Primary Examiner* — Nathan Erb

(74) *Attorney, Agent, or Firm* — Concept IP LLP; Pejman Yedidsion

(57) ABSTRACT

Systems and methods which implement localized functionality in a client server system using a technique of caching one or more functional objects for access in response to an appropriate server call are shown. Embodiments provide a browser based postage indicia generation and printing solution in which a browser upon which a postage client is operable is controlled to cache one or more functional objects in the form of script files. Various functional objects may be optimized for caching by clients such as postal rating scripts, postal insurance rating scripts, address verification scripts, etc. Security and/or accuracy verification may be implemented by a server to independently verify the results of use of functional objects by a client.

19 Claims, 2 Drawing Sheets

(56) References Cited

U.S. PATENT DOCUMENTS

| | | | | |
|---|---|---|---|---|
| 2,887,326 | A | 5/1959 | Kramer | |
| 3,221,980 | A | 12/1965 | Mecur | |
| 3,380,648 | A | 4/1968 | De Lyra | |
| 3,658,239 | A | 4/1972 | Foutz | |
| 3,747,837 | A | 7/1973 | Wilson | |
| 3,978,457 | A | 8/1976 | Check, Jr. et al. | |
| 4,024,380 | A | 5/1977 | Gunn | |
| 4,245,775 | A | 1/1981 | Conn | |
| 4,253,158 | A | 2/1981 | McFiggans | |
| 4,271,481 | A | 6/1981 | Check, Jr. et al. | |
| 4,306,299 | A | 12/1981 | Check, Jr. et al. | |
| 4,376,299 | A | 3/1983 | Rivest | |
| 4,511,793 | A | 4/1985 | Racanelli | |
| 4,565,317 | A | 1/1986 | Kranz | |
| 4,629,871 | A | 12/1986 | Scribner et al. | |
| 4,641,347 | A | 2/1987 | Clark et al. | |
| 4,649,266 | A | 3/1987 | Eckert | |
| 4,661,001 | A | 4/1987 | Takai et al. | |
| 4,709,850 | A | 12/1987 | Wagner | |
| 4,725,718 | A | 2/1988 | Sansone et al. | |
| 4,743,747 | A | 5/1988 | Fougere et al. | |
| 4,757,537 | A | 7/1988 | Edelmann et al. | |
| 4,760,532 | A | 7/1988 | Sansone et al. | |
| 4,763,271 | A | 8/1988 | Field | |
| 4,775,246 | A | 10/1988 | Edelmann et al. | |
| 4,784,317 | A | 11/1988 | Chen et al. | |
| 4,800,506 | A | 1/1989 | Axelrod et al. | |
| 4,802,218 | A | 1/1989 | Wright et al. | |
| 4,812,994 | A | 3/1989 | Taylor et al. | |
| 4,821,195 | A | 4/1989 | Baer et al. | |
| 4,831,554 | A | 5/1989 | Storace et al. | |
| 4,831,555 | A | 5/1989 | Sansone et al. | |
| 4,837,701 | A | 6/1989 | Sansone et al. | |
| 4,853,865 | A | 8/1989 | Sansone et al. | |
| 4,858,138 | A | 8/1989 | Talmadge | |
| 4,862,386 | A | 8/1989 | Axelrod et al. | |
| 4,864,618 | A | 9/1989 | Wright et al. | |
| 4,868,757 | A | 9/1989 | Gil | |
| 4,873,645 | A | 10/1989 | Hunter et al. | |
| 4,900,903 | A | 2/1990 | Wright et al. | |
| 4,900,904 | A | 2/1990 | Wright et al. | |
| 4,900,941 | A | 2/1990 | Barton et al. | |
| 4,901,241 | A | 2/1990 | Schneck | |
| 4,908,770 | A | 3/1990 | Breault et al. | |
| 4,910,686 | A | 3/1990 | Chang et al. | |
| 4,919,325 | A | 4/1990 | Culver | |
| 4,933,849 | A | 6/1990 | Connell et al. | |
| 4,934,846 | A | 6/1990 | Gilham | |
| 4,941,091 | A | 7/1990 | Breault et al. | |
| 4,947,333 | A | 8/1990 | Sansone et al. | |
| 4,993,752 | A | 2/1991 | Juszak | |
| 4,998,204 | A | 3/1991 | Sansone et al. | |
| 5,025,141 | A | 6/1991 | Bolan | |
| 5,058,008 | A | 10/1991 | Schumacher | |
| 5,065,000 | A | 11/1991 | Pusic | |
| 5,079,714 | A | 1/1992 | Manduley et al. | |
| 5,085,470 | A | 2/1992 | Peach et al. | |
| 5,091,771 | A | 2/1992 | Bolan et al. | |
| 5,111,030 | A | 5/1992 | Brasington et al. | |
| 5,119,306 | A | 6/1992 | Metelits et al. | |
| 5,136,647 | A | 8/1992 | Haber et al. | |
| 5,150,407 | A | 9/1992 | Chan | |
| 5,200,903 | A | 4/1993 | Gilham et al. | |
| 5,202,834 | A | 4/1993 | Gilham | |
| 5,233,657 | A | 8/1993 | Gunther | |
| 5,237,506 | A | 8/1993 | Horbal et al. | |
| 5,239,168 | A | 8/1993 | Dursty, Jr. et al. | |
| 5,280,531 | A | 1/1994 | Hunter | |
| 5,289,540 | A | 2/1994 | Jones | |
| 5,316,208 | A | 5/1994 | Petkovsek | |
| 5,319,562 | A | 6/1994 | Whitehouse | |
| 5,323,323 | A | 6/1994 | Gilham | |
| 5,323,465 | A | 6/1994 | Avarne | |
| 5,341,505 | A | 8/1994 | Whitehouse | |
| 5,375,172 | A | 12/1994 | Chrosny | |
| 5,388,049 | A | 2/1995 | Sansone et al. | |
| 5,423,573 | A | 6/1995 | de Passille | |
| 5,437,441 | A | 8/1995 | Tuhro et al. | |
| 5,439,721 | A | 8/1995 | Pedroli et al. | |
| 5,454,038 | A | 9/1995 | Cordery et al. | |
| 5,468,945 | A | 11/1995 | Huggett et al. | |
| 5,471,925 | A | 12/1995 | Heinrich et al. | |
| 5,476,420 | A | 12/1995 | Manning | |
| 5,490,077 | A | 2/1996 | Freytag | |
| 5,501,393 | A | 3/1996 | Walz | |
| 5,510,992 | A | 4/1996 | Kara | |
| 5,573,277 | A | 11/1996 | Petkovsek | |
| 5,583,779 | A | 12/1996 | Naclerio et al. | |
| 5,592,666 | A | 1/1997 | Perez | |
| 5,598,970 | A | 2/1997 | Mudry et al. | |
| 5,600,562 | A | 2/1997 | Guenther | |
| 5,602,743 | A | 2/1997 | Fraytag | |
| 5,606,507 | A | 2/1997 | Kara | |
| 5,606,508 | A | 2/1997 | Thiel | |
| 5,606,613 | A | 2/1997 | Lee et al. | |
| 5,615,123 | A | 3/1997 | Davidson et al. | |
| 5,615,312 | A | 3/1997 | Kohler | |
| 5,617,519 | A | 4/1997 | Herbert | |
| 5,619,571 | A | 4/1997 | Sandstrom et al. | |
| 5,623,546 | A | 4/1997 | Hardy et al. | |
| 5,649,118 | A | 7/1997 | Carlisle et al. | |
| 5,650,934 | A | 7/1997 | Manduley | |
| 5,655,023 | A | 8/1997 | Cordery et al. | |
| 5,666,284 | A | 9/1997 | Kara | |
| 5,675,650 | A | 10/1997 | Cordery et al. | |
| 5,696,829 | A | 12/1997 | Cordery et al. | |
| 5,699,258 | A * | 12/1997 | Thiel ................ | G07B 17/00362 705/401 |
| 5,706,502 | A | 1/1998 | Foley et al. | |
| 5,715,314 | A | 2/1998 | Payne et al. | |
| 5,717,596 | A | 2/1998 | Bernard et al. | |
| 5,717,597 | A | 2/1998 | Kara | |
| 5,742,683 | A | 4/1998 | Lee et al. | |
| 5,745,887 | A | 4/1998 | Gargiulo et al. | |
| 5,774,554 | A | 6/1998 | Gilham | |
| 5,774,886 | A | 6/1998 | Kara | |
| 5,778,076 | A | 7/1998 | Kara et al. | |
| 5,791,553 | A | 8/1998 | Fabel | |
| 5,796,834 | A | 8/1998 | Whitney et al. | |
| 5,799,290 | A | 8/1998 | Dolan et al. | |
| 5,801,364 | A | 9/1998 | Kara et al. | |
| 5,801,944 | A | 9/1998 | Kara | |
| 5,805,810 | A | 9/1998 | Maxwell | |
| 5,812,991 | A | 9/1998 | Kara | |
| 5,819,240 | A | 10/1998 | Kara | |
| 5,822,739 | A | 10/1998 | Kara | |
| 5,825,893 | A | 10/1998 | Kara | |
| 5,860,068 | A | 1/1999 | Cook | |
| 5,884,277 | A | 3/1999 | Khosla | |
| 5,902,439 | A | 5/1999 | Pike et al. | |
| 5,923,406 | A | 7/1999 | Brasington et al. | |
| 5,923,885 | A | 7/1999 | Johnson et al. | |
| 5,929,415 | A | 7/1999 | Berson | |
| 5,946,671 | A | 8/1999 | Herring | |
| 5,983,209 | A | 11/1999 | Kara | |
| 6,005,945 | A | 12/1999 | Whitehouse | |
| 6,010,156 | A | 1/2000 | Block | |
| 6,026,385 | A | 2/2000 | Harvey et al. | |
| 6,061,670 | A | 5/2000 | Brand | |
| 6,098,057 | A | 8/2000 | Dlugos | |
| D434,438 | S | 11/2000 | Kara | |
| 6,155,476 | A | 12/2000 | Fabel | |
| 6,173,888 | B1 | 1/2001 | Fabel | |
| 6,202,057 | B1 | 3/2001 | Pierce | |
| 6,208,980 | B1 | 3/2001 | Kara | |
| 6,209,779 | B1 | 4/2001 | Fabel | |
| 6,233,565 | B1 * | 5/2001 | Lewis ................. | H04L 63/0442 705/40 |
| 6,442,525 | B1 | 8/2002 | Silverbrook et al. | |
| 6,470,327 | B1 * | 10/2002 | Carroll ............... | G07B 17/0008 705/401 |
| 6,721,717 | B2 | 4/2004 | Kramer | |
| 6,820,065 | B1 | 11/2004 | Naclerio | |
| 6,865,561 | B1 | 3/2005 | Allport et al. | |

(56) References Cited

U.S. PATENT DOCUMENTS

| | | | | |
|---|---|---|---|---|
| 7,103,583 | B1 * | 9/2006 | Baum | G07B 17/0008 705/401 |
| 7,110,576 | B2 * | 9/2006 | Norris, Jr. | G07B 17/00435 178/20.01 |
| 7,136,839 | B2 * | 11/2006 | Lee | G07B 17/00362 705/401 |
| 7,249,050 | B1 | 7/2007 | Walker et al. | |
| 7,433,849 | B2 | 10/2008 | Cordery et al. | |
| 7,774,284 | B2 | 8/2010 | Williams et al. | |
| 8,000,988 | B1 | 8/2011 | Bezanson et al. | |
| 8,078,293 | B2 | 12/2011 | Campagna et al. | |
| 8,150,781 | B2 | 4/2012 | McCall et al. | |
| 8,195,579 | B2 | 6/2012 | Kara | |
| 8,412,641 | B2 | 4/2013 | Zeisset et al. | |
| 8,630,912 | B2 * | 1/2014 | Seki | G06Q 30/0601 705/26.1 |
| 10,089,797 | B1 * | 10/2018 | Begen | G07B 17/0008 |
| 10,930,088 | B1 * | 2/2021 | Begen | G07B 17/0008 |
| 2001/0007086 | A1 | 7/2001 | Rogers et al. | |
| 2001/0016487 | A1 | 8/2001 | Hiatt, Jr. | |
| 2001/0032278 | A1 | 10/2001 | Brown et al. | |
| 2001/0037320 | A1 | 11/2001 | Allport et al. | |
| 2002/0032668 | A1 | 3/2002 | Kohler et al. | |
| 2002/0152127 | A1 | 10/2002 | Hamilton et al. | |
| 2003/0004824 | A1 | 1/2003 | Joshi et al. | |
| 2003/0144972 | A1 | 7/2003 | Cordery et al. | |
| 2004/0083189 | A1 | 4/2004 | Leon | |
| 2004/0089711 | A1 | 5/2004 | Sandru | |
| 2004/0122779 | A1 | 6/2004 | Stickler et al. | |
| 2004/0133438 | A1 | 7/2004 | Zeisset et al. | |
| 2004/0243523 | A1 | 12/2004 | Herbert | |
| 2004/0258089 | A1 | 12/2004 | Derechin et al. | |
| 2004/0267676 | A1 | 12/2004 | Feng et al. | |
| 2005/0137991 | A1 | 6/2005 | Bruce et al. | |
| 2005/0256811 | A1 | 11/2005 | Pagel et al. | |
| 2007/0011023 | A1 | 1/2007 | Silverbrook | |
| 2007/0043839 | A1 * | 2/2007 | Amadio | G06F 16/9577 707/E17.121 |
| 2007/0174213 | A1 | 7/2007 | Whitehouse et al. | |
| 2007/0233754 | A1 | 10/2007 | Baeuerle et al. | |
| 2008/0127139 | A1 * | 5/2008 | Skaistis | G06Q 10/08 707/999.001 |
| 2008/0178162 | A1 | 7/2008 | Sanford et al. | |
| 2008/0228669 | A1 | 9/2008 | Harris et al. | |
| 2008/0298568 | A1 | 12/2008 | Karandikar | |
| 2009/0144230 | A1 | 6/2009 | Fant | |
| 2009/0241030 | A1 | 9/2009 | von Eicken et al. | |
| 2009/0319395 | A1 | 12/2009 | Chandaria | |
| 2010/0269030 | A1 * | 10/2010 | Dugonjic | G06Q 30/02 715/835 |
| 2010/0299205 | A1 * | 11/2010 | Erdmann | G06Q 30/02 705/14.54 |
| 2011/0071954 | A1 | 3/2011 | McCall et al. | |

FOREIGN PATENT DOCUMENTS

| | | | |
|---|---|---|---|
| EP | 0927958 | A2 | 7/1999 |
| EP | 0927963 | A2 | 7/1999 |
| FR | 2580844 | A1 | 10/1986 |
| GB | 2251210 | A | 7/1992 |
| JP | 04-284558 | B2 | 10/1992 |
| JP | 05-132049 | | 5/1993 |
| JP | 09-508220 | | 8/1997 |
| JP | 2000-105845 | A | 4/2000 |
| WO | WO-88/01818 | A1 | 3/1988 |
| WO | WO-1995/19016 | A2 | 7/1995 |
| WO | WO-98/14907 | A2 | 4/1998 |
| WO | WO-98/14909 | A2 | 4/1998 |
| WO | WO-98/57302 | A1 | 12/1998 |
| WO | WO-98/57460 | A1 | 12/1998 |

OTHER PUBLICATIONS

Davies, Brad L. "Printing System for Preventing Injustice by Delivering Print Data from Postal Charge Meter to Printer," Jan. 2001, 1 page.

Office Action dated Mar. 13, 2007 for JP 515,253/97; with English language translation (4 pages).

Minnick, Robert, "Postage Imprinting Apparatus and Methods for Use With a Computer Printer", Apr. 27, 1995, 71 pages.

Office Action issued for Japanese Patent Application No. 515,253/1997, dated Apr. 21, 2009; 5 pages (with English language translation).

"Service contracts: profit center or necessary evil. (heating and air conditioning maintenance contracts)", Whitaker, Bert, Air Conditioning, Heating & Refrigeration News, v192, n3, p22(2).

"Information-Based Indicia Program (IBIP): Performance Criteria for Information-Based Indicia and Security Architecture for Open IBI Postage Evidencing Systems," Feb. 23, 2000, The United States Postal Service (USPS), 80 pages.

Unpublished U.S. Appl. No. 10/606,579 to Ogg, filed Jun. 26, 2003 and entitled "System and Method for Automatically Processing Mail.".

* cited by examiner

SYSTEMS AND METHODS FOR PROVIDING LOCALIZED FUNCTIONALITY IN BROWSER BASED POSTAGE TRANSACTIONS

CROSS-REFERENCE TO RELATED APPLICATIONS

The present application is a continuation of U.S. patent application Ser. No. 16/114,819 filed Aug. 28, 2018 and entitled “SYSTEMS AND METHODS FOR PROVIDING LOCALIZED FUNCTIONALITY IN BROWSER BASED POSTAGE TRANSACTIONS,” which is a continuation of U.S. patent application Ser. No. 12/713,033 filed Feb. 25, 2010 and entitled “SYSTEMS AND METHODS FOR PROVIDING LOCALIZED FUNCTIONALITY IN BROWSER BASED POSTAGE TRANSACTIONS,” which issued Oct. 2, 2018 as U.S. Pat. No. 10,089,797, and is related to commonly assigned U.S. patent application Ser. No. 10/862,058 filed Jun. 4, 2004 and entitled “VIRTUAL SECURITY DEVICE,” the disclosures of which are incorporated herein by reference in their entirety.

TECHNICAL FIELD

The present invention relates to conducting transactions for the generation of postage indicia and, more particularly, to providing localized functionality in browser based postage transactions.

BACKGROUND OF THE INVENTION

Computer based systems for generating and printing postage indicia have been available for a number of years, see for example U.S. Pat. No. 5,510,992 entitled “System and Method for Automatically Printing Postage on Mail” and U.S. Pat. No. 5,822,739 entitled “System and Method for Remote Postage Metering,” assigned to Stamps.com, Inc. the assignee of the present application. Such computer based systems have largely replaced more traditional postage meters in many market segments because of the widespread availability of appropriate host systems, ease of use, etc. However, there remains room for advancement with respect to the operation and use of such computer based systems in performing postage transactions.

Client server computer based postage indicia generation and printing systems typically invoke a series of server calls from the client in order to generate and print postage indicia. For example, a postage client may operate to collect data about a postal item and desired postal service from a user and issue a postage server call, transmitting the collected postal item information to the postage server, to obtain a postal rate for the postal item. If the user wishes to change an aspect of the desired postal service (e.g., request first class rather than overnight) or alters an aspect of the postal item (e.g., size or weight), another postage server call, transmitting the revised postal item information to the postage server, is made to obtain a revised postal rate for the postal item. Thereafter, the postage client may issue additional postage server calls for completing postage indicia generation, such as a postage server call to have the addressee information validated, a postage server call to obtain an insurance rate, etc. Upon completing the postage indicia generation processing to the user’s satisfaction, a postage server call may be made by the postage client to request generation of the postage indicia and transmission of the postage indicia to the postage client for printing.

Each of the foregoing postage server calls requires appreciable time to complete (e.g., up to seconds or longer). Nevertheless, the client server model typically implements such centralized functionality to facilitate the use of a relatively thin postage client, thereby facilitating its widespread distribution and operation, to avoid issues with maintaining software and database updates throughout the network, etc.

BRIEF SUMMARY OF THE INVENTION

The present invention is directed to systems and methods which implement localized functionality in a client server system using a technique of caching one or more functional objects for access in response to an appropriate server call. For example, embodiments of the invention provide a browser based postage indicia generation and printing solution in which a browser (upon which a postage client is operable) is controlled to cache one or more functional objects in the form of script files, such as may comprise postage rating scripts, postage insurance rate scripts, address validation scripts, etc. Such functional objects are preferably accessed by an appropriate postage server call, such as through the use of a corresponding uniform resource locator (URL) or other resource identifier, which is redirected to the cache by the browser. Accordingly, a client may be provided functionality associated with the functional object without experiencing the latency associated with communication to and from the corresponding server.

Embodiments of the invention operate to facilitate transparent management of the localized functional objects, to thereby provide appropriate updating of functional objects without requiring express user interaction or even knowledge of the updating. For example, when the data of any such functional object becomes out of date, or otherwise requires updating, the resource identifier for an updated functional object is provided to the client according to embodiments, and thus the previously cached functional object is no longer utilized by the client. Upon initially accessing the updated functional object, the updated functional object is preferably cached for subsequent use by the client.

Various functional objects may be optimized for caching by clients according to embodiments of the invention. For example, postal rating tables may be divided by zones (e.g., shipper location zones) and postage rating scripts created for each such zone. A postage client may thus access and cache a postage rating script for a zone appropriate to the user thereof, thereby avoiding transfer of the complete rating table information to the cache. Accordingly, in addition to avoiding latency associated with communication to and from a postage server for rating information during subsequent postage transactions, embodiments operate to minimize latency associated with initially caching the functional objects.

Embodiments of the invention implement security and/or accuracy verification with respect to the use of localized functionality herein. For example, functional objects provided for use by clients may be subject to malicious or inadvertent alteration, or otherwise be improperly used. Accordingly, embodiments of the invention implement verification by a server of the results of use of the use of functional objects by a client prior to completing a transaction. For example, a postage server may operate to independently verify the rate calculation for a postage indicium requested to be generated by a postage client having implemented a postage rating script. Such verification may be done in conjunction with another server call to facilitate efficiencies with respect to client server communications provided through the use of localized functional objects of embodiments of the invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
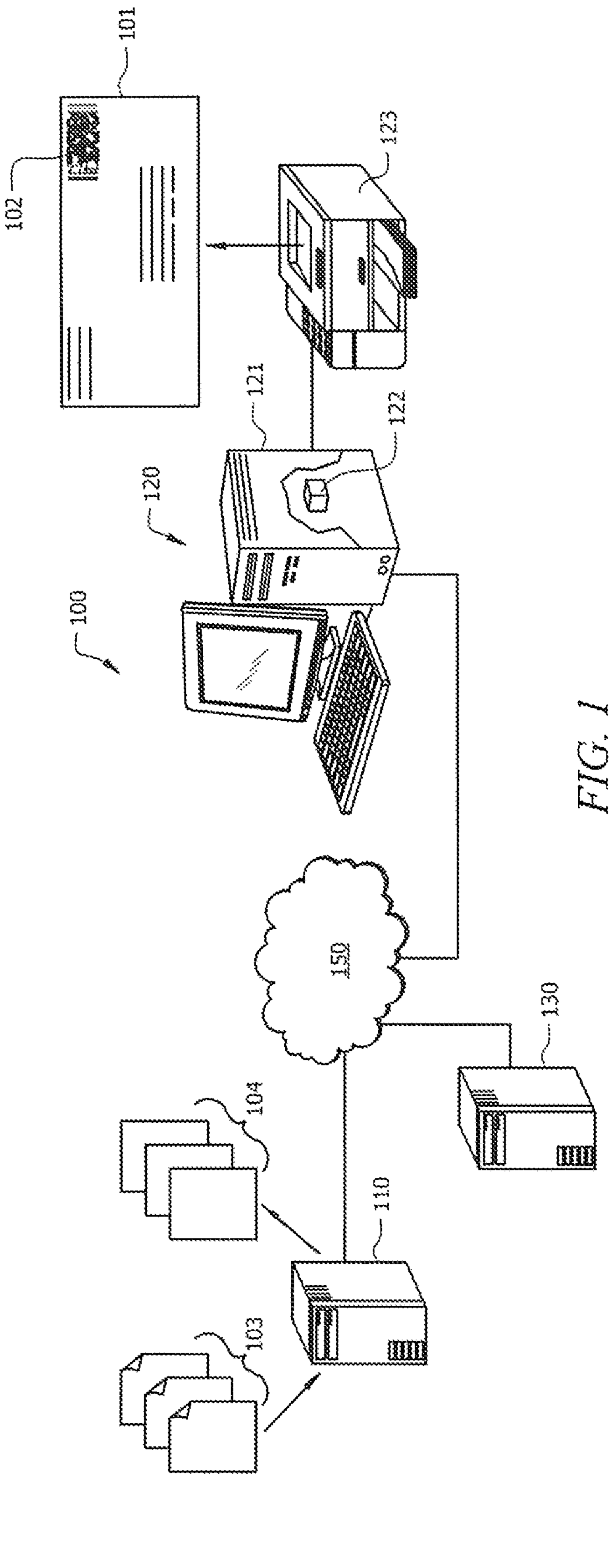
FIG. 1 shows a system adapted according to embodiments of the invention.

FIG. 1 shows system 100 adapted according to embodiments of the invention to implement localized functionality in a client server system using a technique of caching one or more functional objects for access in response to an appropriate server call. In order to aid in understanding the concepts of the present invention, exemplary embodiments herein will be discussed with reference to operation of system 100 as a postage indicia generation and printing system. However, it should be appreciated that the concepts of the present invention are applicable to systems operable to provide additional or alternative functionality.

The illustrated embodiment of system 100 comprises client system 120 in communication with server system 110 via network 150. Client system 120 of embodiments is operable as a postage client and correspondingly server system 120 of embodiments is operable as a postage server. Accordingly, client system 120 and server system 110 of embodiments cooperate to generate and print postage indicia 102, such as may be utilized with respect to postal item 101.

Server system 110 may comprise one or more processor-based systems operable to provide server side operation as described herein. For example, server system 110 may comprise a computer having a processor (e.g., processors from the PENTIUM and/or XEON line of processors available from Intel Corporation), memory (e.g., random access memory (RAM), read only memory (ROM), magnetic memory, optical memory, flash memory, etc.), input/output apparatuses (e.g., display, keyboard, mouse, printer, etc.), and network interface (e.g., Ethernet interface, optical interface, T1 interface, etc.) operable under control of an instruction set defining operation as described herein.

Client system 120 may likewise comprise one or more processor-based systems operable to provide client side operation as described herein. For example, client system 120 may comprise a computer having a processor (e.g., processors from the PENTIUM and/or XEON line of processors available from Intel Corporation), memory (e.g., RAM, ROM, magnetic memory, optical memory, flash memory, etc.), input/output apparatuses (e.g., display, keyboard, mouse, printer, etc.), and network interface (e.g., Ethernet interface, optical interface, T1 interface, etc.) operable under control of an instruction set defining operation as described herein. The illustrated embodiment of client system 120 includes memory 122, operable to provide a cache memory utilized as described below, and printer 123, operable to provide printing of postage indicia 102.

Network 150 may comprise one or more networks suitable for facilitating communication between server system 110 and client system 120. For example, network 150 may comprise a local area network (LAN), metropolitan area network (MAN), wide area network (WAN), wireless network, the public switched telephone network (PSTN), the Internet, an intranet, an extranet, etc.

It should be appreciated that network 150 may include systems in addition to server system 110 and client system 120, whether utilized in providing functionality associated with server system 110 and client system 120 or separate therefrom. For example, network 150 may comprise additional servers and clients in addition to routers, gateways, bridges, repeaters, switches, caches, etc. The illustrated embodiment of system 100 shows system 130, such as may comprise a proxy server utilized by client system 120, as representative of such additional systems.

In operation according to embodiments of the invention, server system 110 functions as a web-based postage server (postage web server) providing postage indicia generation web services to clients. Accordingly, server system 110 may serve various web pages, such as may comprise platform independent hypertext mark-up language (HTML), extensible mark-up language (XML), or JAVA based web pages, to clients for performing postage indicia generation. Correspondingly, client system 120 of embodiments functions as a web-based postage client (postage web client) providing a postage indicia generation user interface to users. Accordingly, embodiments of client system 120 operate as a browser-based client, wherein platform independent code is operable within browser software executing upon client system 120. Examples of browser software as may be utilized according to embodiments of the invention include INTERNET EXPLORER available from Microsoft Corporation, FIREFOX available from Mozilla Corporation, SAFARI available from Apple Inc., and NETSCAPE NAVIGATOR available from Netscape communications Corporation.

Figure 2:
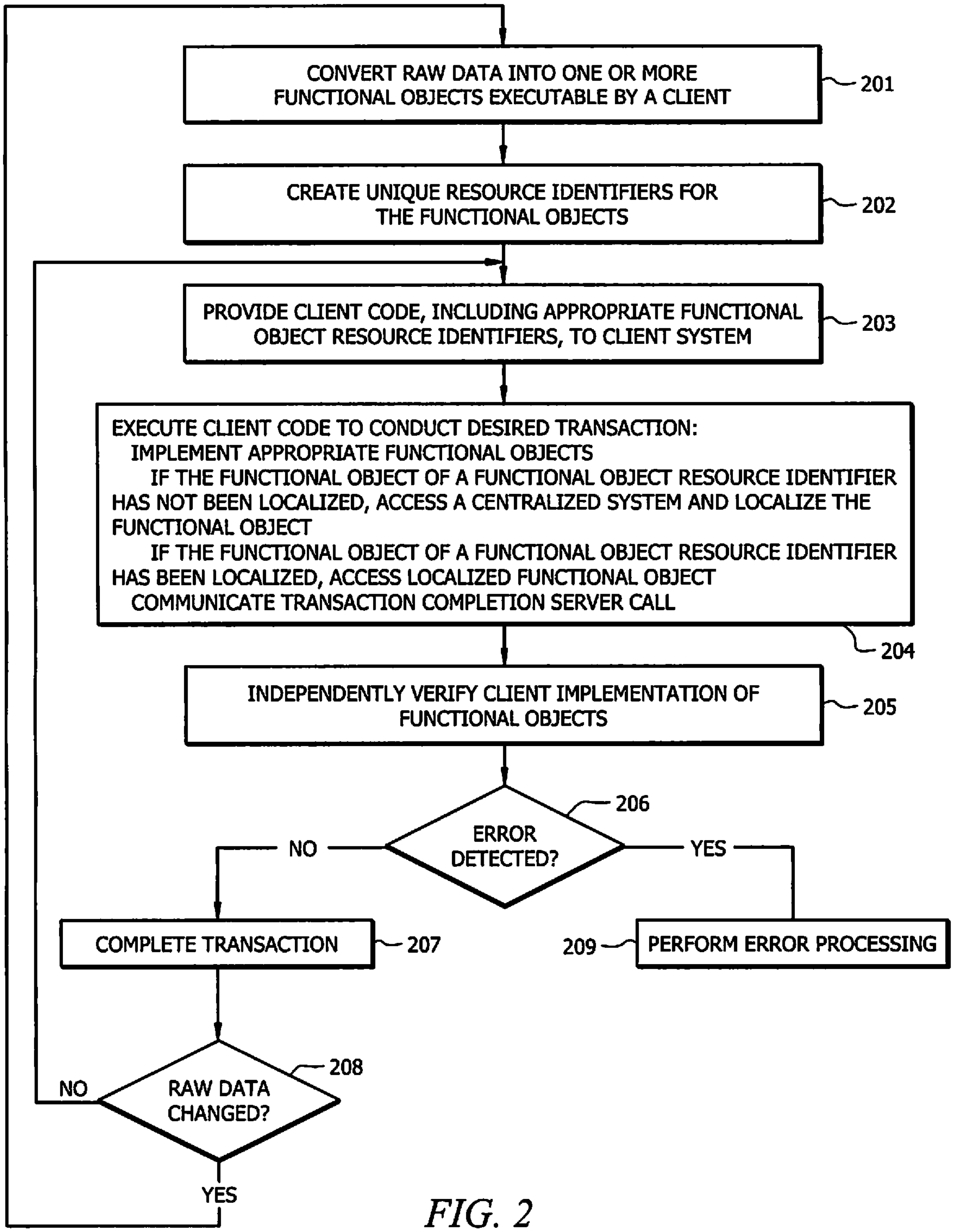
FIG. 2 shows a high level flow diagram of operation according to an embodiment of the invention.

FIG. 2 shows a high level flow diagram of operation of system 100 implementing localized functionality in a client server system using a technique of caching one or more functional objects for access in response to an appropriate server call. It should be appreciated that the particular functionality, the order of the functionality, etc. provided in FIG. 2 is intended to be exemplary of operation in accordance with the concepts of the present invention. Accordingly, the concepts herein may be implemented in various ways differing from that of the illustrated embodiment.

At block 201 of the illustrated embodiment raw data (e.g., data 103 of FIG. 1) is converted by server system 110 into one or more functional objects (e.g., functional objects 104 of FIG. 1) executable by client system 120. For example, postage rate tables, insurance rate tables, address validation databases, and/or the like may be provided to server system 110 for use in providing postage indicia generation functionality. In order to provide such data in a form to facilitate localized functionality using a caching technique, server system 110 of embodiments converts such raw data, or a portion thereof, into functional objects.

Raw data from which a functional object is created may comprise an amount of data in excess to that which can be communicated efficiently via network 150. Accordingly, embodiments of the invention operate to parse the raw data for creating useful functional objects adapted for network communication and caching as discussed herein. For example, raw data in the form of a table of postage rates throughout the nation may be parsed into smaller, useful blocks of data, such as to provide individual rate tables for each shipper zone in the nation. Such individual rate tables may thus be converted into a plurality of functional objects, each of a size conducive to communication via network 150.

Other forms of data, such as insurance rates, address databases, etc. may be similarly parsed into a plurality of functional objects. For example, an address database used for verifying recipient address information, as is required for particular services offered by the United States Postal Service (USPS), is on the order of several gigabytes. Thus, such an address database is not generally suitable for efficient communication to a client in a typical client server scenario. Embodiments of the present invention operate to parse the address database to a reduced database sufficient for verifying that the city, state, and zip code information of recipient addresses are correct (e.g., omitting additional detail with respect to the addresses), which is sufficient to satisfy the requirements of many services of the USPS. The reduced database may further be parsed into smaller collections of data, such as commercial addresses, residential addresses, geographic regions, etc. The resulting reduced address database functional objects are each preferably of a size conducive to communication via network 150.

Functional objects of embodiments of the invention comprise script files which are executable within a browser operable upon client system 120. For example, functional objects of an embodiment of the invention may comprise a JAVA script file executable by a browser of client system 120. It should be appreciated that such a script file may not only include appropriate data from the aforementioned raw data, but also includes appropriate instructions (e.g., executable code) to define operation by the host browser to perform desired functionality with respect to the data.

One or more of such functional objects may be relevant to any particular user or situation. Thus, appropriate ones of the functional objects may be provided to clients according to embodiments of the invention, as discussed below.

At block 202 of the illustrated embodiment unique or substantially unique resource identifiers are created by server system 110 for each of the functional objects. For example, unique uniform resource locators (URLs) may be assigned to each such functional object, whereby the corresponding functional object is served by server system 110 to client system 120 upon the browser of client system 120 accessing the unique URL. The resource identifiers utilized according to embodiments of the invention may include designators indicative of the type of data included in the functional objects, the valid date or dates for the data included in the functional objects, or other attributes regarding the use or contents of the functional objects. Alternatively, the resource identifiers utilized according to embodiments of the invention may be arbitrary with respect to the functional objects.

As previously mentioned, and as will be better appreciated from the discussion which follows, the resource identifiers provide unique or substantially unique identification of an associated functional object. By substantially unique, it is meant that within the typical operation of system 100 a resource identifier is unique. Although resource identifiers may ultimately be repeated, and thus not truly unique, such repetition is provided such that disambiguation between two or more functional objects is not required. The foregoing unique identification not only facilitates operation of appropriate functionality through access of a functional object using its resource identification, but also facilitates updating, replacement, revision, etc. of the functional objects without express user interaction or even knowledge of the updating and without actively flushing out of date functional objects from cache, all within the normal operational framework of host browser software.

At block 203 of the illustrated embodiment client code for performing postage indicia generation operation is provided by server system 110 to client system 120. For example, a user of client system 120 may launch browser software thereon and navigate to a web page served by server system 110 for postage indicia generation services. This may result in code, such as in the form of a web page, applets, etc., being provided by server system 110 to client system 120. The foregoing code preferably includes resource identifiers (e.g., URLs) for appropriate functional objects useful to the user's generation of postage indicia for implementing one or more functional objects as desired for postage indicia generation.

At block 204 of the illustrated embodiment, client system 120 executes the code within a host browser thereof to provide postage indicia generation operation in cooperation with server system 110. Details with respect to client server operation to provide postage indicia generation and printing is provided in aforementioned patent application entitled "Virtual Security Device."

Execution of postage indicia generation code provided to client system 120 of embodiments of the invention operates to implement one or more of the foregoing functional objects, as appropriate. Moreover, such execution implements localized functionality, within the normal operational framework of host browser software, using a technique of caching one or more such functional objects for access in response to an appropriate server call.

In operation according to embodiments of the invention, where execution of the postage indicia generation code by client system 120 is to implement functionality provided by a particular functional object, the resource identifier for a current instance of the functional object is present in the code. The browser of client system 120 then accesses the functional object using the resource identifier. If the current instance of the functional object, as indicated by its unique or substantially unique resource identifier, has not been previously accessed by client system 120, the resource identifier will direct the browser to server system 110, or other resource server, to provide the functional object to client system 120. Operation of the host browser of client system 120, perhaps in accordance with instructions of the postage indicia generation code, causes the current instance of the functional object to be cached, such as within memory 122 by a browser cache of client system 120. Accordingly, if the current instance of the functional object has been previously accessed by client system 120, the functional object will be accessed from cache (e.g., from memory 122) when the resource identifier directs the browser to server system 110, or other resource server.

The foregoing operation facilitates providing only those functional objects actually utilized by a client system to that client system. Accordingly, where a client system only utilizes a limited amount of data, such as associated with a single shipping zone, only the functional object containing that data need be provided to the client system. If the client system should subsequently need additional data, such as associated with another shipping zone, the functional object containing that data may be provided to the client system when needed. Each such functional object is preferably cached for subsequent use by the client system. However, embodiments of the invention may operate to cache only particular functional objects, such as those expected to receive repeated use, those historically receiving repeated use, etc.

It should be appreciated that caching of functional objects according to embodiments of the present invention differs significantly from mere automatic caching of data. For example, embodiments of the invention operate to cache a parsed subset of data and code for its use as an object for future performing functions in the future (e.g., future calculations). Automated caching merely caches the information provided to the client. Where postage rating functionality is performed, such caching would result in only the particular rate determination for a mail piece being cached (which is generally not useful with respect to future mail pieces). A server would not generally provide a postage rate table to the client in prior client server models due to the size of the rate table being too large to efficiently communicate and too large for caching/storage by the client. Moreover, the foregoing unique or substantially unique resource identifiers facilitates updating, replacement, revision, etc. of the functional objects without express user interaction or even knowledge of the updating and without actively flushing out of date functional objects from cache, all within the normal operational framework of host browser software. That is, as the data of a functional object becomes out of date, and thus an updated functional object is created, an updated unique resource identifier is used to direct the client to the updated functional object rather than using a cached instance of the functional object.

As previously mentioned, the functional objects of embodiments of the invention comprise script files which are executable within the browser operable upon client system 120. Such script files according to embodiments includes appropriate instructions (e.g., executable code) and data to define operation by the host browser to perform desired functionality. For example, the postage indicia generation code may operate to solicit information regarding a mail piece, a destination address, the class of service desired, etc. and invoke a functional object providing postage rating functionality. Thus the functional object may be executed by client system 120 to determine a postage rate appropriate to the postal item. Where the user has previously invoked this postage rating functionality, communication with server system 110 may be avoided and client system 120 may autonomously operate to provide the rating functionality. Should the user wish to view various postage rating options, multiple instances of server calls may likewise be avoided.

A plurality of functional objects may be invoked, one or more of which may itself be invoked a plurality of times, throughout execution of the postage indicia generation code. Continuing with the above example, after operation to provide postal item rating using a first functional object, an embodiment of the present invention may invoke a second functional object, such as to calculate an insurance rate for the postal item appropriate to the postal service selected, verify recipient address information (e.g., ensure the city, state, and zip code for the intended recipient are correct and up to date), etc.

After operation of the postage indicia generation code and appropriate functional objects, the illustrated embodiment of block 204 operates to make a transaction completion server call from client system 120 to server system 110. For example, having collected postal item information, determined a postal rate for the selected postal service, and verified the city, state, and zip code of a recipient address is accurate, client system 120 may provide the appropriate information to server system 110 to request generation of a postage indicium, preferably associated with debiting a postal security device (e.g., postage vault) by an amount suitable for the postage indicium and/or the postage indicia generation service.

At block 205 of the illustrated embodiment, server system 110 operates to independently verify proper implementation of the functional objects. Functional objects provided for use by clients may be subject to malicious or inadvertent alteration, or otherwise be improperly used. Accordingly, server system 110 of the illustrated embodiment implements verification of the results of use of the use of functional objects by client system 120 prior to completing a transaction (e.g., prior to generating a requested postage indicium). For example, server system 110 may operate to independently verify the rate calculation for a postage indicium requested to be generated by client system 120 having implemented a postage rating script. Such verification may be accomplished using mail piece data provided by client system 120 and rating table information available at server system 110. Such verification not only prevents instances of functional object tampering or alternation, but may also be used to ensure that the most up to date information has been used with respect to the related functions.

At block 206 of the illustrated embodiment a determination is made as to whether the foregoing verification has detected an error. If an error is detected, processing according to the illustrated embodiment proceeds to block 209 for performing error processing. For example, client system 120 may be prevented from further postage indicia generation operation until a source of the error can be determined. Alternatively, a functional object associated with the detected error may be pushed to client system 120 and postage indicia generation operation repeated in an attempt to correct the error.

If, however, no error is detected at block 206, processing according to the illustrated embodiment proceeds to block 207 for completion of the transaction. For example, server system 110 may generate the requested postage indicium, preferably debiting a postal security device (e.g., postage vault) associated with the user, and providing a data packet comprising the generated postage indicium to client system 120. Client system 120 may utilize the data packet comprising the generated postage indicium to print postage indicium 102 on mail piece 101 using printer 123.

Upon completion of the transaction at block 207, processing according to the illustrated embodiment proceeds to block 208 wherein a determination is made as to whether any of the raw data of the functional objects has changed (e.g., data has been updated, has expired, etc.). If the raw data has not changed, processing according to the illustrated embodiment returns to block 203 to facilitate performing repeated transactions using the current instance of the functional objects. However, if the raw data, or a portion thereof, has changed, processing according to the illustrated embodiment returns to block 201 to facilitate conversion of the changed raw data to a revised (then to be current) instance of a functional object. As previously mentioned, the use of resource identifiers according to embodiments facilitates operation of the clients to use up to date functional objects provided by such processing.

It should be appreciated that operation according to the embodiment of FIG. 2 provides localized functionality in system 100 using a technique of caching one or more functional objects for access in response to an appropriate server call. Accordingly, latency associated with communication to and from server system 110 is avoided when performing particular functions. The latency avoided in a typical postage indicia generation scenario may be in the range of 2-3 seconds for each function call. Accordingly, where a function is repeated (e.g., when comparing rate options) and where multiple functions are performed (e.g., postage rating, insurance rating, address verification, etc.) appreciable amounts of time may be saved with respect to completing an individual transaction. Where multiple transactions are performed (e.g., generating postage indicia for a batch of mail items), aggregated amounts of time become quite substantial. Moreover, not only is latency associated with communication reduced according to embodiments of the invention, but processing load is reduced at server system 110 thereby facilitating a reduction in latency associated with processing delays.

It should be appreciated that, although embodiments have been discussed herein with reference to providing functional objects to clients by server 110, embodiments of the invention may implement various techniques for distributing functional objects to clients. For example, a copy and distribute network may be implemented wherein various servers which are geographically dispersed are provided with functional objects. Resource identifiers utilized according to embodiments of the invention may operate to obtain a functional object from a particular server disposed geographically most near a client system, thereby further optimizing network communications utilized in the client server processing.

Although embodiments have been discussed with respect to caching functional objects in a memory of the client system, the localized functionality provided herein need not be cached in such a memory to achieve benefits as discussed herein. For example, functional objects may be cached by server 130, such as may comprise a proxy server, disposed more near client system 120 (e.g., on a same LAN, geographically more near, etc.) than is server system 110 and latency may be reduced as discussed above.

It should be appreciated that the concepts herein are not limited in applicability to the exemplary postage indicia generation processing. For example, embodiments of the present invention may be implemented with respect to client server services implementing amortization tables, tax rate tables, regulations, etc. Similarly, the concepts herein are not limited in applicability to the exemplary postal items. For example, embodiments of the present invention may be implemented with respect to items transported by services such as Federal Express, United Parcel Service, trucking services, rail services, air carrier services, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:

storing, by a postage client device in a memory thereof, an executable postal function script for subsequent execution by the postage client device when performing postage indicia generation transactions, wherein the executable postal function script comprises raw postal function data useful for performing a particular postal function associated with postage indicia generation transactions converted into the executable postal function script;

generating, by the postage client device, a postage indicium, wherein generation of the postage indicia comprises:

initiating a postage server call using a substantially unique resource identifier that redirects to the executable postal function script stored in the memory; and executing the executable postal function script to generate the postage indicium; and receiving, by the postage client device if the raw postal function data corresponding to the executable postal function script becomes out of date, a replacement substantially unique resource identifier for an updated executable postal function script for use by the postage client device when performing postage indicia generation, wherein the updated executable postal function script comprises updated raw postal function data useful for performing postage indicia generation and replaces the executable postal function script used to generate the postage indicium.

2. The method of claim 1, wherein the raw postal function data comprises postal rating information and the particular postal function comprises rating a postal item for postage indicia generation.

3. The method of claim 2, wherein the executable postal function script comprises a subset of the postal rating information selected as appropriate for the postage client device.

4. The method of claim 3, wherein the subset of the postal rating information comprises postal rating information for a shipper zone corresponding to the postage client device.

5. The method of claim 1, wherein the raw postal function data comprises postal insurance information and the particular postal function comprises postal insurance rating for a postal item for postage indicia generation.

6. The method of claim 1, wherein the raw postal function data comprises address verification information and the executable postal function script is configured to verify at least a portion of an address for a postal item for postage indicia generation.

7. The method of claim 6, wherein the address verification comprises verifying that city, state, and zip code information of recipient addresses are correct and omits additional address information of an address database accessible to a postage server device.

8. The method of claim 1, wherein the substantially unique resource identifier comprises a substantially unique uniform resource locator (URL).

9. The method of claim 1, wherein the executable postal function script and the updated executable postal function script are configured to generate postage indicia for shipping mail items using at least one of a plurality of shipping carriers.

10. The method of claim 1, wherein the executable postal function script and the updated executable postal function script are configured to provide comparative rating information for rates associated with a plurality of shipping carriers.

11. The method of claim 1, wherein the executable postal function script and the updated executable postal function script comprise platform independent code.

12. A postal client device configured to perform postage indicia generation, the postal client device comprising:

a memory storing an executable postal function script configured to perform postage indicia generation, wherein the executable postal function script comprises raw postal function data for generation of postage indicia, and wherein the executable postal function script is associated with a substantially unique resource identifier; and one or more processors configured to:

generate a postage indicium, wherein generation of the postage indicia comprises:

initiating a postage server call using the substantially unique resource identifier that redirects to the executable postal function script stored in the memory; and executing the executable postal function script to generate the postage indicium; and receive, if the raw postal function data corresponding to the executable postal function script becomes out of date, a replacement substantially unique resource identifier for an updated executable postal function script executable by the one or more processors to perform postage indicia generation, wherein the updated executable postal function script comprises updated raw postal function data useful for performing postage indicia generation and replaces the executable postal function script used to generate the postage indicium.

13. The postal client device of claim 12, wherein the executable postal function script and the updated executable postal function script are configured to provide comparative rating information for rates associated with a plurality of shipping carriers.

14. The postal client device of claim 12, wherein the executable postal function script and the updated executable postal function script are configured to provide comparative rating information for rates corresponding to at least one of a plurality of shipping carriers.

15. The postal client device of claim 12, wherein the raw postal function data comprises postal rating information for calculating a postage rate for shipping a postal item.

16. A method comprising:

identifying, at a postage generation server system, a subset of raw postage rating data as useful to a remote postage client device using one or more postage rating script functional objects for creating postage indicia;

converting, at the postage generation server system, the subset of raw postage rating data into the one or more postage rating script functional objects;

sending, by the postage generation server system, the one or more postage rating script functional objects to the remote postage client device via a network, wherein the remote postage client device stores the one or more postage rating script functional objects for subsequent use during generation of postage indicia requests;

receiving, at the postage generation server system, a postage indicium request created by the remote postage client device using a postage rating script functional object of the one or more postage rating script functional objects stored at the remote postage client device;

determining, by the postage generation server system, whether the postage rating script functional object produced an erroneous postage indicium request; and sending an updated postage rating script functional object to said remote postage client device to replace the postage rating script functional object in response to a determination the postage rating script functional object produced an erroneous postage indicium request.

17. The method of claim 16, wherein the one or more postage rating script functional objects and the updated postage rating script functional object are configured to generate postage indicia for shipping mail items using at least one of a plurality of shipping carriers.

18. The method of claim 16, wherein the postage rating script functional object and the updated postage rating script functional object are configured to provide comparative rating information for rates associated with a plurality of shipping carriers.

19. A method comprising:

sending, by a postage generation server system, one or more postage rating script functional objects to a remote postage client device via a network, wherein the remote postage client device stores the one or more postage rating script functional objects for subsequent use during generation of postage indicia requests;

generating a substantially unique identifier configured to redirect a server call to the postage generation server system to one of the one or more postage rating script functional objects stored by the postage client device;

receiving, at the postage generation server system, a postage indicium request created by the remote postage client device using a postage rating script functional object of the one or more postage rating script functional objects stored at the remote postage client device;

determining, by the postage generation server system, whether the postage rating script functional object produced an erroneous postage indicium request; and sending an updated postage rating script functional object to said remote postage client device to replace the postage rating script functional object in response to a determination the postage rating script functional object produced an erroneous postage indicium request.

* * * * *